Jan. 16, 1923.
A. CATTONI.
DEVICE FOR SETTING AND REMOVING TIRES.
FILED APR. 14, 1922.
1,442,649.
2 SHEETS—SHEET 1.
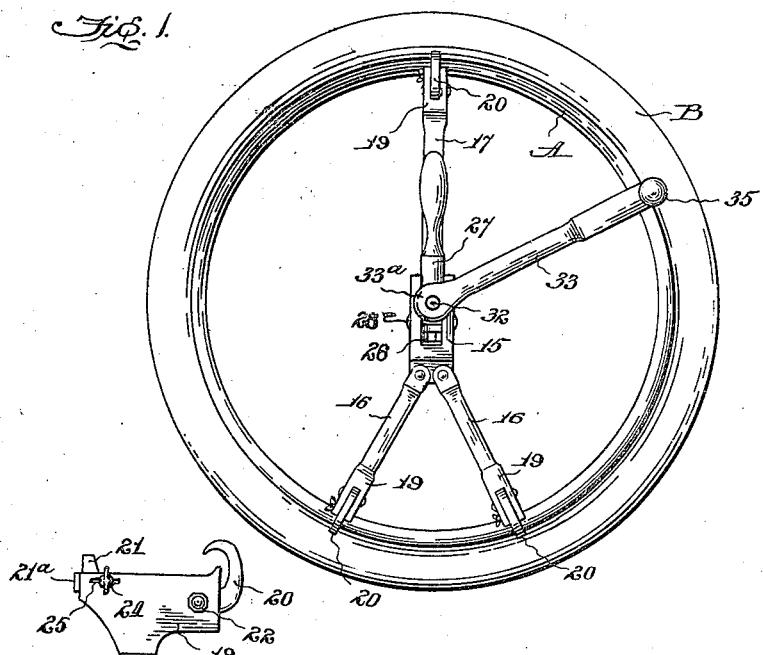
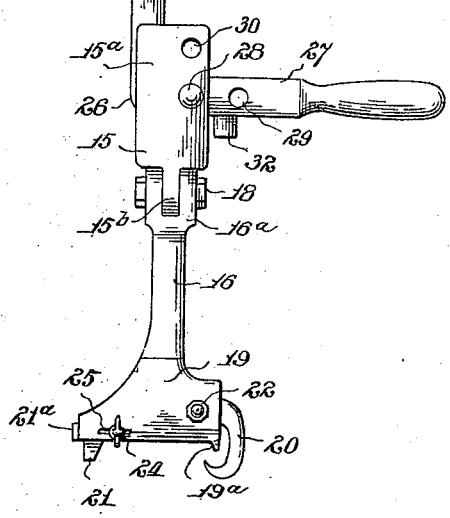
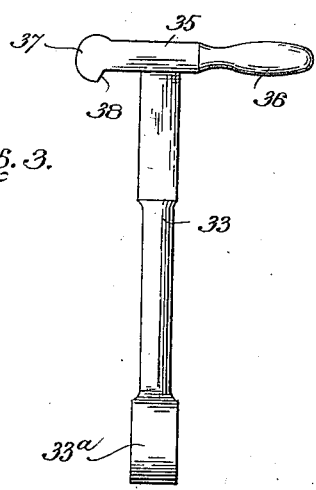
Albino Cattoni.
INVENTOR.
BY John D Thomas Co.
ATTORNEYS.

Jan. 16, 1923.
A. CATTONI.
DEVICE FOR SETTING AND REMOVING TIRES.
FILED APR. 14, 1922.
1,442,649.
2 SHEETS—SHEET 2.
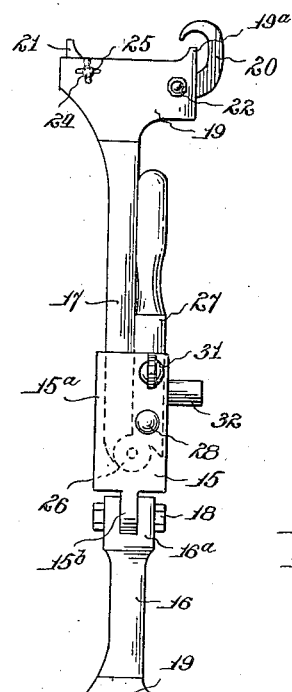
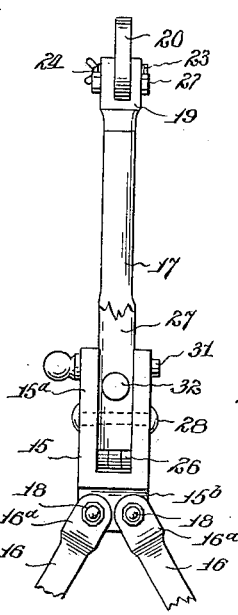
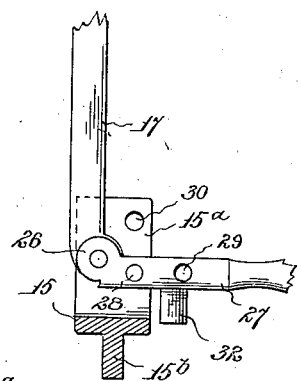
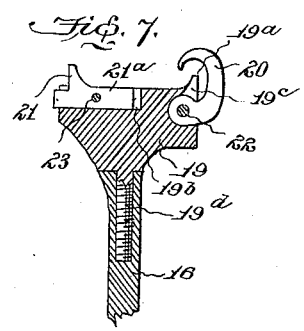
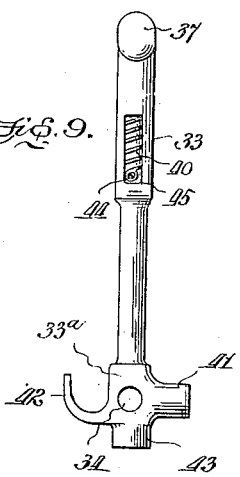
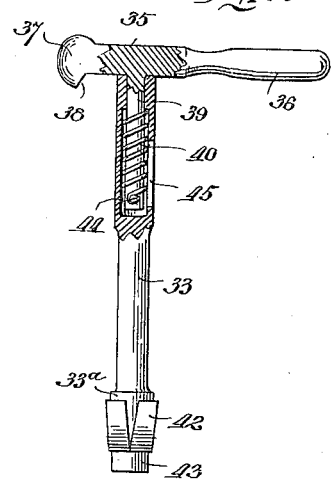
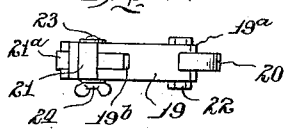
Albino Cattoni.
INVENTOR.
BY John D Thomas Co.
ATTORNEYS.

Patented Jan. 16, 1923.

1,442,649

UNITED STATES PATENT OFFICE.

ALBINO CATTONI, OF BRADFORD, PENNSYLVANIA.

DEVICE FOR SETTING AND REMOVING TIRES.

Application filed April 14, 1922. Serial No. 552,460.

*To all whom it may concern:*

Be it known that I, ALBINO CATTONI, a citizen of the United States, and a resident of Bradford, in the county of McKean and State of Pennsylvania, have invented a Device for Setting and Removing Tires, of which the following is a specification.

My invention is an improvement in tire setting and removing devices which are especially adapted for operation on automobile wheels provided with pneumatic tires mounted on detachable rims.

The primary object of my invention is to provide a set of implements which will greatly facilitate the operation of applying a tire to and removing a tire from the detached rim of an automobile wheel, whereby a frame is first securely fastened to the rim to provide a rigid fulcrum and an implement is used in connection with said frame and fulcrum for manipulation in forcing a tire on to the rim or removing a tire from the same.

A further object of my invention is to so form one of the implements that it will also provide a combination tool that may be conveniently used in other repair work about an automobile.

With these principal objects in view my invention consists in the particular construction and arrangement of parts constituting the device for setting and removing tires, as hereinafter described and specifically set forth in the appended claims.

In the accompanying drawings, forming a part of this specification:

Fig. 1 is a front elevation showing the application of my invention to the rim and tire of an automobile wheel.

Fig. 2 is a detail view, in side elevation, of the frame which is attached to the wheel-rim, the adjustable arm of the clamping means thereof being extended.

Fig. 3 is a detail view of the implement used in connection with the frame.

Fig. 4 is a side elevation of the frame with the adjustable arm retracted and parts locked in this position.

Fig. 5 is a front elevation of said frame with the parts arranged as in Fig. 4.

Fig. 6 is a sectional view through a part of the supporting frame.

Fig. 7 is a longitudinal section view through the outer end of one of the arms of the supporting-frame to illustrate the means engaging the rim of the wheel.

Fig. 8 is an end view thereof.

Figs. 9 and 10 are views illustrating a modification of the implement used in connection with the supporting-frame.

Like numerals of reference indicate like parts in all the figures of the drawings.

In carrying out my invention I provide a frame which is firmly clamped to the detached rim of an automobile wheel to form a central fulcrum and in connection with said frame employ an implement supported by the fulcrum for manipulation in either applying a pneumatic tire to or removing it from the rim.

The supporting-frame comprises a fulcrum-block 15 and arms 16 and 17 by which said fulcrum-block is rigidly supported in connection with the rim, the fulcrum-block in the present instance being in the form of a casting with parallel members $15^a$ $15^a$ separated at their upper ends and connected together at their lower ends, from which latter point depends an ear $15^b$ providing for the pivotal connection of the arms 16 16 to the block while the other arm, 17, is located between the aforesaid members $15^a$ $15^a$ and forms part of the means, hereinafter described, for clamping the frame to the rim. Each arm 16 is provided at its inner end with a yoke $16^a$ by which it is hinged to the attaching-ear $15^b$ by bolt 18, and at its outer end each arm is provided with a cross-head 19 to engage the inner side of the rim A and with a hook 20 engaging the outer edge of said rim, the hook cooperating with a lug $19^a$ on the adjoining end of the cross-head and adjustable jaw 21 at the opposite end of said cross-head. Hook 20 swings in a recess $19^c$ in one end of the cross-head on a bolt 22, and the adjustable jaw 21 is movable in a recess $19^b$ at the other end of said cross-head, being held in adjusted position by means of a clamping-bolt 23 and winged nut 24, the bolt passing transversely through a hole in the body portion of the jaw and through slots 25 in opposite sides of the cross-head. As will be noted the adjustable jaw provides for gripping the rim between it and the fixed lug or jaw $19^a$, while the hook forms the main gripping member when the frame is clamped in place on the rim.

For rigidly clamping the frame on to the rim the third arm 17 is connected by knuckle-joint 26 to the inner end of a lever 27 pivoted between the members $15^a$ $15^a$ of the fulcrum block 15 on a pin 28, said lever being provided at its outer end with a handle for manipulating the same and at the opposite side of its pivot from the knuckle-joint with a hole 29 adapted to register with a corresponding hole 30 through the members 15$^a$ when the said lever is thrown upward to retract the arm 17, in which position the parts are held by a locking-pin 31. The clamping-arm 17 is provided at its outer end with rim engaging means similar to those hereinbefore described with reference to the hinged arms 16, and therefore the several parts thereof are designated by similar reference-numerals. The attachment of this supporting frame to the detached rim of an automobile wheel will be readily understood by reference to the drawings, for the outer ends of the arms 16 16 being first connected to the rim the movable arm 17 is projected by throwing the lever 27 downward at right-angle thereto and after the outer end of said arm is connected to the rim the lever is thrown upward to clamp the frame on to the rim by retracting said arm, the lever being then locked by inserting the pin 31 through the registering holes 29 and 30. In order that this supporting frame may be adjusted to accommodate rims of different diameters each cross-head, or any one of them only if desired, is connected to its arm by means of a shank 19$^b$ threaded into the end of the arm to vary the length of the gripping-arm.

The fulcrum for the implement employed in connection with the supporting-frame is in the present instance located on the lever 27, being in the form of a rounded lug 32, said lug being located with respect to the operating parts of the frame so as to be disposed at the center of the rim when the frame is clamped in place, and of course it is on that side of the lever to project outwardly therefrom beyond the fulcrum-block when said lever is in locked position.

The implement used for applying and removing a tire, as B, from the rim A is in the form of a rod 33 having a hub 33$^a$ at one end with an opening 34 to receive the aforementioned lug 32 on the supporting frame, said rod carrying at its other end a tool to be manipulated in forcing a tire on to the rim or removing a tire from the rim and comprising a cross-piece 35 with a handle 36 at one end and a rounded head 37 at the other. The head is shaped for pressing the same against the inner edge or flange of the tire or shoe in forcing the same over the flange of the rim, and is also provided with a shoulder 38 for engaging the flange on the rim to permit the device to be moved around the rim in engagement therewith during the operation of applying or removing a tire, during which the rod 33 serves as a rotatable support connected at its inner end to the lug 32 on the main supporting frame clamped on the rim. To provide for movement of the tool with respect to its supporting rod in using the same on a tire the cross-piece 35 is provided centrally with a stem 39 let into a bore in the outer end of the rod 33 and engaged by a spring 40 adapted to hold the tool against the end of the rod.

Instead of having a plain hub 33$^a$ at the inner end of the rod 33 of the implement carrying the manipulating tool hereinbefore described I prefer to form the hub in such manner that the said implement may be usable for different purposes about an automobile in making repairs, etc., and to this end the hub is shaped to present several tools or a combination tool; for instance, as shown in Figs. 9 and 10, in which there is a hammer with head 41 and claw 42, and also a socket-wrench 43. For more conveniently using the implement as a hammer, or a wrench, I provide for removing the tool or cross-piece at the end of the rod or handle, for which purpose the spring 40 is connected to the stem 39 by a screw 44 and the rod provided with a longitudinal slot 45 by which easy access may be had to said screw; whereby when the spring is disconnected from the stem and the tool removed from the end of the rod the latter serves as a handle and the use of the implement as a hammer is not interfered with by the cross-piece.

In the operation of the device for applying a tire to the detached rim of an automobile wheel the frame is first rigidly connected to the rim in the manner hereinbefore set forth to provide a firm fulcrum for the manipulation of the implement shown in Figs. 3, 9 and 10, and after springing a part of the tire on the rim the implement is fulcrumed on the lug 32 of the frame and manipulated to force the loose portion of the tire on to the rim, in which operation the head 37 is pressed against said loose portion of the tire until it is on the rim and the shoulder 38 engages the flange of the rim, the implement being then swung around to press the tire in place. A similar operation is performed in removing a tire, in which instance the head 37 is forced under the flange of the tire casing at one point and the implement swung around to loosen the tire or casing. It will thus be seen that the device provides a very convenient means to facilitate the operation of applying and removing tires from the detachable rims of automobile wheels.

Having described my invention, I claim:

1. A device for applying and removing tires comprising a frame having a fulcrum projecting therefrom, means for securing the frame to the rim of a wheel, and an implement engaging the lug comprising a rod having a hub at one end and a bore in the other end, a cross-piece with a stem let into the bore, and a spring engaging the stem and rod to hold the cross-piece against the end of the rod by spring pressure.

2. A device for applying and removing tires comprising a frame having a fulcrum-lug projecting therefrom, means for securing the frame to the rim of a wheel, and an implement engaging the lug and having a cross-piece with a handle at one end and a rounded head at the other, the lower part of said head being cut away to provide a shoulder at the inner side thereof, substantially as shown and for the purpose set forth.

3. A device for applying and removing tires comprising a frame consisting of a block, arms connected to the block and having means at their outer ends for engaging the rim of a wheel, a clamping-arm movable within the block, and a lever pivoted in the block and connected to the arm for operating the same to clamp the frame in place on the rim; together with an implement supported by the frame.

4. A device for applying and removing tires comprising a frame consisting of a block, arms connected to the block and having means at their outer ends for engaging the rim of the wheel, one of said arms being movable in the block, a lever pivoted in the block and connected to the movable arm for operating the same to clamp the frame in place on the rim, and means for locking the lever; together with an implement supported by the frame and rotatable with respect thereto.

5. A device for applying and removing tires comprising a frame consisting of a block, arms connected to the block and having at their outer ends a fixed jaw, an adjustable jaw and a hook, for engaging the rim of a wheel, one of said arms being movable, a lever pivoted to the block and connected to the movable arm for operating the same to clamp the frame in place on the rim, and an implement rotatably connected to the block and comprising a rod with a cross-piece at the outer end thereof, said cross-piece having a handle at one end and means at the other for engaging the tire and rim, substantially as herein shown and described.

6. A device for applying and removing tires comprising a frame consisting of a block, arms connected to the block and having means at their outer ends for engaging the rim of the wheel, one of said arms being movable in the block, a lever pivoted in the block and connected to the movable arm for operating the same to clamp the frame in place on the rim, said lever and block having holes which register to receive a locking pin when the lever is thrown to clamp the frame to the rim, and a lug projecting from the lever to provide a fulcrum; together with an implement mounted on the fulcrum and rotatable thereon.

ALBINO CATTONI.